Feb. 23, 1960
H. K. FOSTER
2,926,230
DETACHABLE TEMPERATURE REGULATING CONNECTOR
FOR ELECTRICALLY HEATED DEVICES
Original Filed Sept. 22, 1955
2 Sheets-Sheet 1
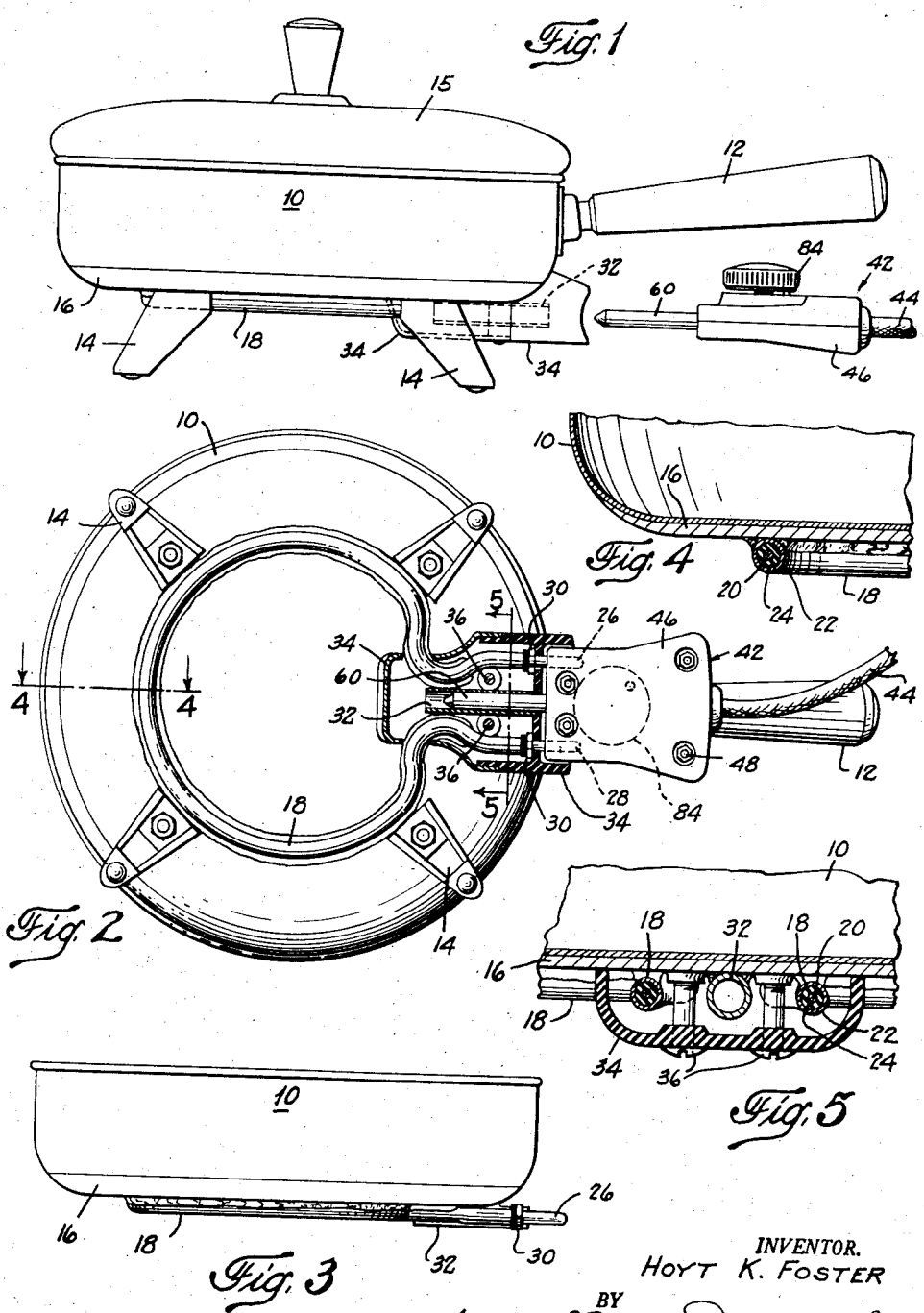
INVENTOR.
HOYT K. FOSTER
BY
Morgan, Finnegan, Durham & Pine
ATTORNEYS.

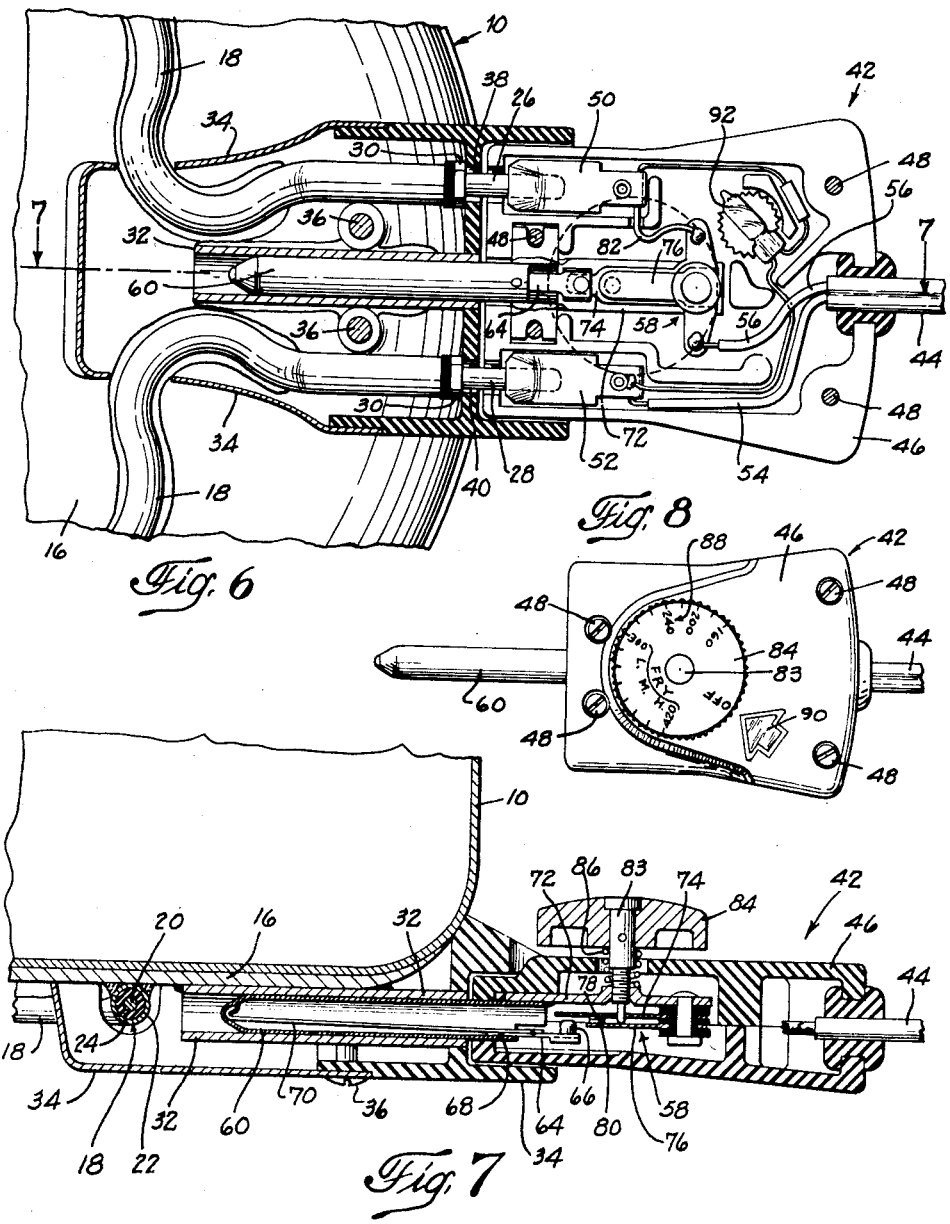

United States Patent Office
2,926,230
Patented Feb. 23, 1960

2,926,230

DETACHABLE TEMPERATURE REGULATING CONNECTOR FOR ELECTRICALLY HEATED DEVICES

Hoyt K. Foster, Hollis, N.Y., assignor to S. W. Farber, Inc., New York, N.Y., a corporation of New York Original application September 22, 1955, Serial No. 535,797. Divided and this application February 10, 1959, Serial No. 792,387

13 Claims. (Cl. 200—136.5)

This invention relates to heating devices for cooking and other purposes and more specifically concerns a novel and improved detachable electrical connector and temperature regulator for electrically controlled heating devices.

Objects and advantages of the invention will be set forth in part hereinafter and part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

In the drawings:

Figure 1 is an elevational view of the cooking utensil with the adjustable thermostatic control in accordance with the invention being disconnected from the heating element that is secured to the bottom of the utensil;

Figure 2 is an elevational view of the bottom of the utensil showing the thermostatic control in its connected position;

Figure 3 is an elevational view of the container portion of the utensil showing the heating element and terminals for cooperation with the detachable connector, the legs of the utensil and the housing disposed about the terminal ends of the heating element have been omitted for clarity;

Figure 4 is a transverse sectional view taken generally along line 4—4 of Figure 2;

Figure 5 is a sectional view taken along line 5—5 of Figure 2 showing the disposition of the housing disposed about the terminal ends of the heating element and the sleeve which is interposed between these terminal ends and secured to the bottom of the container of the utensil and receives the thermostatic element of the detachable connector regulator;

Figure 6 is a detailed view, to enlarged scale, showing the terminal ends of the heating element with the temperature regulator secured thereto in its operative position with portions of the housing disposed about the terminal ends of the element being broken away and the bottom portion of the housing of the regulator being removed in order to show the cooperation of the detachable connector with the utensil;

Figure 7 is a sectional view taken along line 7—7 of Figure 6;

Figure 8 is a top elevational view of the detachable temperature regulator in accordance with the invention.

The present invention has for its object the provision of an improved detachable connector and temperature regulator for an electrically heated cooking utensil having a waterproof electrical heating element secured thereto. The detachable regulator is removably secured to this heating element and is operative to connect the element with a source of electrical power and effective to control the temperature of the cooking utensil. Another object of the invention is the provision of regulating means for electrically heated devices which is adjustable with the adjustment being effected through a movable member provided with indicia to indicate the various temperature settings and with an index being provided for these indicia which is illuminated when the heating element of the utensil is energized. A still further object of the invention is to provide a detachable connector for a cooking utensil wherein the regulating means is adapted to be disposed within a housing and is connected with the heating element through a plug type connection. Another object of the invention is to provide a detachable electrical connector for an electrical cooking utensil wherein the control mechanism for regulating the temperature of the utensil is of extremely simple and rugged construction, being economical to manufacture and yet extremely reliable and accurate in its operation.

In accordance with the present invention the detachable connector which may take any of a variety of forms for use with devices such as frying pans, dutch ovens, sauce pans, stew pots, deep fat fryers, griddles, etc. is arranged to respond to the temperature of a heated portion of the device. In the illustrated form of device, the container or shell has a substantially flat circular bottom with the shell preferably being fabricated of stainless steel and provided with a thick cladding or facing of aluminum securely bonded to the outer surface of the stainless steel throughout the area of the bottom of the container. Heat is supplied to the container by means of an electrical heater of waterproof construction so that the container may be immersed in water with the heater preferably taking the form of a single conductor positioned within and electrically insulated from a metallic tube which is bonded to the bottom of the container with the conductor and tube being bent generally in a circle of substantially smaller diameter than that of the bottom of the container and with the terminals of the conductor extending outwardly of this circle and forming a pair of parallel spaced prongs. The connector is accordance with the invention supplies electrical energy to the heater and the temperature of the bottom wall is controlled by means of a thermostatic control forming part of the detachable connector which is placed in operative relation with the heated container in readily removable plug fashion with the control device including a housing within which is provided a pair of terminals in the form of receptacles complementary with the terminal ends of the heating element and adapted to frictionally receive the same therewithin. The control mechanism of this improved connector is of compact unitary construction and is mounted on the housing with the temperature sensitive portion extending from the housing and being received within a sleeve secured to the bottom of the container when the connector is in its operative position. This control mechanism includes a switch that is enclosed in the housing and is opened and closed by temperature sensitive actuating mechanism effectively responsive to the temperature of the container and operative, respectively, to cause deenergization and energization of the heating element to maintain the temperature of the container at a desired value. Adjustable means are provided, including an actuating member positioned outside of the housing, for adjusting the operation of the switch and accordingly the control temperature of the container with this actuating member being provided with indicia representing various temperatures of the container and with an index in the form of a window in the wall of the housing being provided for these indicia. Positioned immediately below this window is a light which is connected so as to be illuminated when current is being supplied to the heating element thereby indicating when the element is energized and also accentuating the particular setting of the adjustable member.

It will be understood that the foregoing general description and the following detailed description as well are exemplary and explanatory of the invention but are not restrictive thereof.

Referring now to the drawings wherein like reference characters designate like elements throughout and wherein for the purposes of explanation and illustration the frying pan embodiment of the invention is illustratively disclosed, the reference numeral 10 designates generally a heated utensil having a cylindrical shell or body from which extends the handle 12 and which is provided with feet or legs 14 and removable cover 15. The utensil 10 is fabricated of stainless steel and has a relatively thick slab or layer 16 of aluminum securely bonded to the outer surface of the bottom.

Heat is applied to the utensil or frying pan 10 by the heating element 18 which is of waterproof construction and is securely bonded to the bottom of the frying pan. This heating element comprises a conductor 20 which is positioned within an aluminum sheath or tube 22 and electrically insulated therefrom by means of a layer of magnesia cement 24. The terminal ends 26 and 28 of the conductor 20 extend out from tube 22 and form the prongs of a plug type electrical connection with the heating element being made watertight by means of the nuts 30 threaded on the ends of tube 22 and thereby preventing breakdown of the electrical insulation 24. Positioned intermediate the spaced end portions of heating element 18 is the sleeve 32 which is bonded to the utensil 10 so as to be in good heat exchange relation therewith with this sleeve being adapted to removably receive the temperature sensitive member of the detachable control device as will be explained hereinafter.

In order to prevent the collection of foreign matter about the ends of the heating element 18 as well as sleeve 32 and to render the utensil easy to wash as well as decrease the likelihood of a short circuit developing the housing 34 is provided to enclose the end portions of this element and the sleeve. This housing is tightly secured against the bottom of utensil 10 by means of cap screws 36 and the outer portion of the body of the housing is constructed of a material which is an electrical insulator with the terminal ends or prongs 26 and 28 extending through openings 38 and 40 provided in the front wall thereof.

The electrical heater is controlled by an improved detachable connector and thermostatic control device 42 which is also effective to connect the heater with a source of electrical potential through electrical cord 44. This thermostatic control device 42 includes the housing 46 which is made of two parts held together by means of screws 48 and is fabricated of an electrical insulating material such as a plastic material or the like. Mounted within housing 46 are metallic receptacles 50 and 52 which are adapted to frictionally receive the terminal ends 26 and 28, respectively (as shown in Figure 6) of the heating element 18 in the ordinary electrical plug fashion thereby establishing a readily removable electrical connection between the control device and the heating element. Receptacle 52 is connected directly with conductor 54 of cord 44 while receptacle 50 is connected with conductor 56 of this cord through an adjustable temperature responsive switch mechanism 58 which is mounted in housing 46.

The adjustable temperature responsive switch 58 is of the on-off type and is constructed as a unit and mounted in the housing 46. The temperature sensitive portion of this switch mechanism comprises a stainless steel tube 60 which extends outwardly from housing 46 and is snugly but slidably received within sleeve 32 when control device 42 is in its operative or plugged in position with the terminal ends 26 and 28 received within receptacles 50 and 52. The outer end of tube 60 is preferably closed while the inner end is open with flexible actuating lever 64 extending longitudinally therefrom with its outer end being free and provided with upstanding boss 66 of insulating material while its inner end is secured to tube 60 as by welding at 68. Positioned within the tube 60 is the elongated metallic member 70 which is secured at one end to the outer end of the tube and at the other end to the lever 64. This metallic member 70 is fabricated of a material which has a substantially lower coefficient of thermal expansion than that of tube 60 so that as the temperature of tube 60 and member 70 increase, as will be caused by an increase in temperature of utensil 10 the free end of lever 64 will be moved upward as viewed in Figure 7.

Also extending from and secured to the inner end of tube 60 is the support member 72 upon which are mounted the resilient arms 74 and 76 which carry the electrical contact 78 and 80. The arms 74 and 76 are electrically insulated from support member 72 and from each other except through contacts 78 and 80 which are normally urged into engagement by these arms. The resilient arm 76 is connected directly to conductor 56 of cord 44 while arm 74 is connected to receptacle 50 through wire 82. These resilient arms extend toward the inner end of tube 60 with arm 74 extending beyond arm 76 and overlying the free end of actuating lever 64 so that as this free end moves upwardly in response to an increase in temperature boss 66 will engage arm 74 and open contacts 78 and 80 resulting in a break in the electrical circuit to the heating element and accordingly de-energize the element.

The temperature at which these contacts are opened is adjusted by means of member 83 which is threadedly received within a suitable opening provided within support member 72 with the inner end of this member 83 being of insulating material and extending through an opening provided in arm 74 and into engagement with arm 76. By threaded adjustment of members 83 arms 74 and 76 and accordingly contacts 78 and 80 may be moved relative to the lever 64 so that the temperature at which the lever is effective to open the contacts may be varied with the extreme downward or inward adjustment of this member bringing arm 74 into engagement with boss 66 and accordingly opening contacts 78 and 80 effecting de-energization of the heating element. Member 83 extends through the wall of housing 46 and is provided at its outer end with knob 84 for rotating and accordingly effecting adjustment of the member. The necessary friction to prevent accidental displacement or movement of member 83 is provided by spring 86 interpositioned between knob 84 and support member 72. The upper surface of knob 84 is provided with suitable indicia 88 calibrated to indicate various temperatures of the cooking utensil with index pointer 90 cooperating with these indicia to provide an indication of the temperature setting of the control device and accordingly the temperature at which the control device will maintain the cooking utensil. This index pointer is in the form of a transparent window provided in the wall of housing 46 and directly beneath this window and within housing 46 is mounted the electric light 92, which is preferably of the neon type and is connected across receptacles or terminals 50 and 52 so that the light is illuminated only when current is supplied to heating element 18. This light thus provides an indication as to when the electrical heating element is energized and in addition, since window 90 is an index for the indicia 88 accentuates or emphasizes the particular setting of the adjustable control and accordingly lessens the likelihood of inaccurate adjustment or setting of the control device.

By forming the heating element in a circle as shown in Figure 2 and having its diameter related to that of the bottom of the frying pan in a predetermined manner dead spots, i.e. relatively cold spots, are completely eliminated and the bottom of the frying pan is heated substantially uniformly throughout to insure proper temperature control by the detachable connector. The relatively thick layer 16 of aluminum provided on the bottom of the frying pan facilitates this even heat distribution since it has a relatively high heat transfer coefficient. Moreover, since the heat transfer coefficient of aluminum is substantially higher than that of stainless steel this particular construction is effective to produce an even heat throughout the bottom of the frying pan while having the sides thereof being considerably cooler, resulting in decreased heat loss and a more efficiently operating utensil.

By constructing the thermostatic control device so that it can be merely plugged into the heating element when in use and disconnected therefrom when not in use, the frying pan or other utensil may be washed without fear of damage to any electrical equipment since heating element 18 is itself entirely waterproof and prior to washing the detachable connector and thermostatic control device 42 may be removed permitting complete immersion of the frying pan during the washing operation.

This application is a division of my prior application Serial No. 535,797, filed September 22, 1955, entitled "Electrically Heated Cooking Utensil."

The invention in its broader aspects is not limited to the specific detachable connector shown and described but departures may be made therefrom, within the scope of the accompanying claims, without departing from the principles of the invention and without sacrificing its chief advantages.

What is claimed is:

1. A detachable temperature regulating connector for an electrically heated device comprising in combination a housing, a pair of terminals in said housing for frictional engagement with cooperating terminals on said device, a bracket within said housing, an elongated hollow member carried by said bracket and extending from said housing, said member being formed of a material having a given temperature coefficient of expansion, a pair of electrical contact members affixed to said bracket and connected with at least one of said pair of terminals, a flexible member fixed at one end relative to said bracket and elongated member and extending in a direction generally parallel to said elongated member, the free end of said flexible member being coupled to at least one of said contacts to open and close the contacts when deflected, and a tension member formed of a material having a different temperature coefficient of expansion connecting the distal end of said elongated member with said flexible member at a point between the ends thereof whereby variations in temperature will deflect said flexible member to open and close said contacts.

2. A detachable temperature controlling connector unit for an electrically heated device having spaced terminals, said connector unit comprising in combination a housing, a pair of spaced terminals for cooperating with the said first terminals for applying electrical energy thereto, a support mounted within said housing and carrying a tubular member extending outwardly from said housing in relation to the terminals thereof, said tubular member being adapted to be positioned in heat transfer relation with the said device when its said terminals are positioned in cooperation with the first terminals on said device, a pair of resilient contact carrying members on said support and connected to control the application of energy to said terminals, adjustable means for fixing the position of one of said contact carrying members, and means within said tubular member having its inner end in engagement with the distal end of the tubular member, the outer end of the last said means coupled in motion amplifying relationship to the other of said contact carrying members to actuate the contact carrying members in response to temperature changes sensed by said tubular member, the temperature at which said actuation of the contact carrying members takes place being determined by the position of one contact carrying member.

3. A detachable temperature regulating and power supplying connector for an electrically heated device comprising in combination a hollow housing having an extending portion of substantially uniform configuration and terminating in a substantially flat wall part, the last said wall part including at least three spaced openings, a pair of terminals in said housing aligned with two of said openings, an elongated support member within said housing and disposed longitudinally therein, one end of said support member carrying an elongated hollow probe extending through the third of said openings and from the housing, a pair of cooperating contacts within said housing and mounted on said support, an elongated member within said probe with one end of said member engaging the distal end of said probe and the other end of said member in coupled relationship with said contacts to open and close them in accordance with changes in temperature of said probe, a power supply cable attached to said housing and connected to one of said housing terminals and one of said contacts and a connection between the other of said contacts and the other of said housing terminals.

4. A detachable temperature regulating and power supplying connector for an electrically heated device comprising in combination an elongated hollow housing having an end wall part, including at least three spaced openings, a pair of terminals in said housing aligned with two of said openings, a metallic bracket within said housing, an elongated hollow metallic probe fixedly secured to said bracket and extending through the third of said openings and from the housing, a pair of cooperating contacts within said housing and affixed in insulating relationship to said bracket, an elongated member within said probe with one end of said member engaging the distal end of said probe, and the other end of said member in coupled, motion amplified relationship with said contacts to open and close them in accordance with changes in temperature of said probe, a power supply cable attached to said housing and connected to one of said housing terminals and one of said contacts and a connection between the other of said contacts and the other of said housing terminals.

5. A detachable temperature regulating and power supplying connector according to claim 4, wherein said bracket is elongated and said probe extends from one end thereof in substantially parallel relationship thereto.

6. A detachable temperature controlling unit according to claim 2 wherein said contact carrying members are in overlying stacked relationship.

7. A detachable temperature regulating connector according to claim 3 wherein said cooperating contacts are carried by flat spring members disposed in overlying stacked relationship.

8. A detachable temperature regulating connector according to claim 4 wherein said cooperating contacts are affixed to said bracket in overlying stacked relationship.

9. A detachable temperature regulating connector according to claim 3 including adjustable temperature control means carried by said support member and engaging one of said cooperating contacts to adjust the position of said one cooperating contact relative to the other.

10. A detachable temperature regulating connector according to claim 4 including adjustable temperature control means carried by said bracket and engaging one of said cooperating contacts to adjust the position of said one cooperating contact relative to the other.

11. A detachable temperature regulating connector according to claim 1 wherein said bracket is elongated and said probe extends from one end thereof in substantially parallel relationship thereto.

12. A detachable temperature controlling connector unit according to claim 2 wherein said support is elongated and said probe extends from one end thereof in substantially parallel relationship thereto.

13. A detachable temperature regulating connector according to claim 1 wherein said contact members are in overlying stacked relationship.

References Cited in the file of this patent

UNITED STATES PATENTS

| | | |
|---|---|---|
| Re. 20,570 | Bushway | Dec. 7, 1937 |
| 1,431,542 | Ross | Oct. 10, 1922 |
| 1,662,817 | Bollmann et al. | Mar. 20, 1928 |
| 2,332,212 | Fillo | Oct. 19, 1943 |
| 2,496,229 | Parkhurst | Jan. 31, 1950 |
| 2,793,270 | Burch et al. | May 21, 1957 |

FOREIGN PATENTS

| | | |
|---|---|---|
| 543,995 | Germany | Feb. 12, 1932 |
| 599,517 | Great Britain | Mar. 15, 1948 |